United States Patent [19]

Devin

[11] 4,031,880

[45] June 28, 1977

[54] METHOD AND DEVICE FOR COLLECTING SOLAR ENERGY

[75] Inventor: Bernard Devin, Gif-sur-Yvette, France

[73] Assignee: Commissariat a l'Energie Atomique, Paris, France

[22] Filed: Apr. 19, 1976

[21] Appl. No.: 678,117

[30] Foreign Application Priority Data

Apr. 21, 1975 France .............................. 75.12367

[52] U.S. Cl. .............................. 126/271; 237/1 A; 126/270
[51] Int. Cl.² .......................................... F24J 3/02
[58] Field of Search ........... 126/270, 271; 237/1 A; 165/32, 39, 97, 107, 137

[56] References Cited

UNITED STATES PATENTS

| 3,822,692 | 7/1974 | Demarest | 126/271 |
| 3,981,295 | 9/1976 | Minnick | 126/271 |

*Primary Examiner*—Kenneth W. Sprague
*Assistant Examiner*—James C. Yeung
*Attorney, Agent, or Firm*—Cameron, Kerkam, Sutton, Stowell & Stowell

[57] ABSTRACT

In a system of stationary collectors which are connected together in series and differently oriented with respect to the sun, a heat-transporting fluid is circulated from the collector which is least exposed to solar radiation to the collector which is the most exposed to solar radiation. The direction of flow within the collectors is reversed at a moment of the day which is determined beforehand so as to control the quantity of energy delivered by the collectors.

9 Claims, 4 Drawing Figures

METHOD AND DEVICE FOR COLLECTING SOLAR ENERGY

The present invention relates to a method and to a device for collecting solar energy by means of stationary flat collectors and more especially to a method of interconnection of said collectors.

In most instances solar collectors operate in a random manner since they are dependent on the solar energy which is received in an intermittent manner, especially as a result of cloud formation and variations in orientation of the sun.

A number of solutions have already been proposed with a view to overcoming these disadvantages.

Use is accordingly made of energy collectors which are oriented in directions other than due south in order that each collector should have maximum efficiency at different times of the day.

In another type of orientable collector, the position of the collector with respect to the sun is controlled automatically by a clockwork mechanism.

The present invention provides a novel solution by varying during the course of the day the direction of the path of the heat-transporting liquid which flows through the collectors. It is pointed out that these collectors are of any known type and can in particular be flat, or of the parabolic or cylindrical-parabolic semi-concentration type.

This invention has for its object a method for collecting solar energy by means of a system of stationary collectors differently oriented with respect to the sun, of the type in which a heat-transporting fluid is circulated. An essential feature of this method lies in the fact that the heat-transporting fluid flows through a system of collectors connected together in series from the collector which is the least exposed to solar radiation to the collector which is the most exposed to solar radiation and that the direction of flow of the fluid within the collectors is reversed at a moment of the day which is determined beforehand so as to control the quantity of energy delivered by the collectors.

In a first embodiment of the invention, the direction of flow of the heat-transporting fluid is reversed at midday, thereby obtaining a flat energy response during a large part of the day.

In a second embodiment of the invention, the direction of flow of the heat-transporting fluid is reversed at a time which is determined beforehand in order to obtain a heat peak at one particular moment of the day.

Further characteristic features and advantages of the invention will be brought out by the following description, reference being made to the accompanying drawings, wherein.

Figure 1:
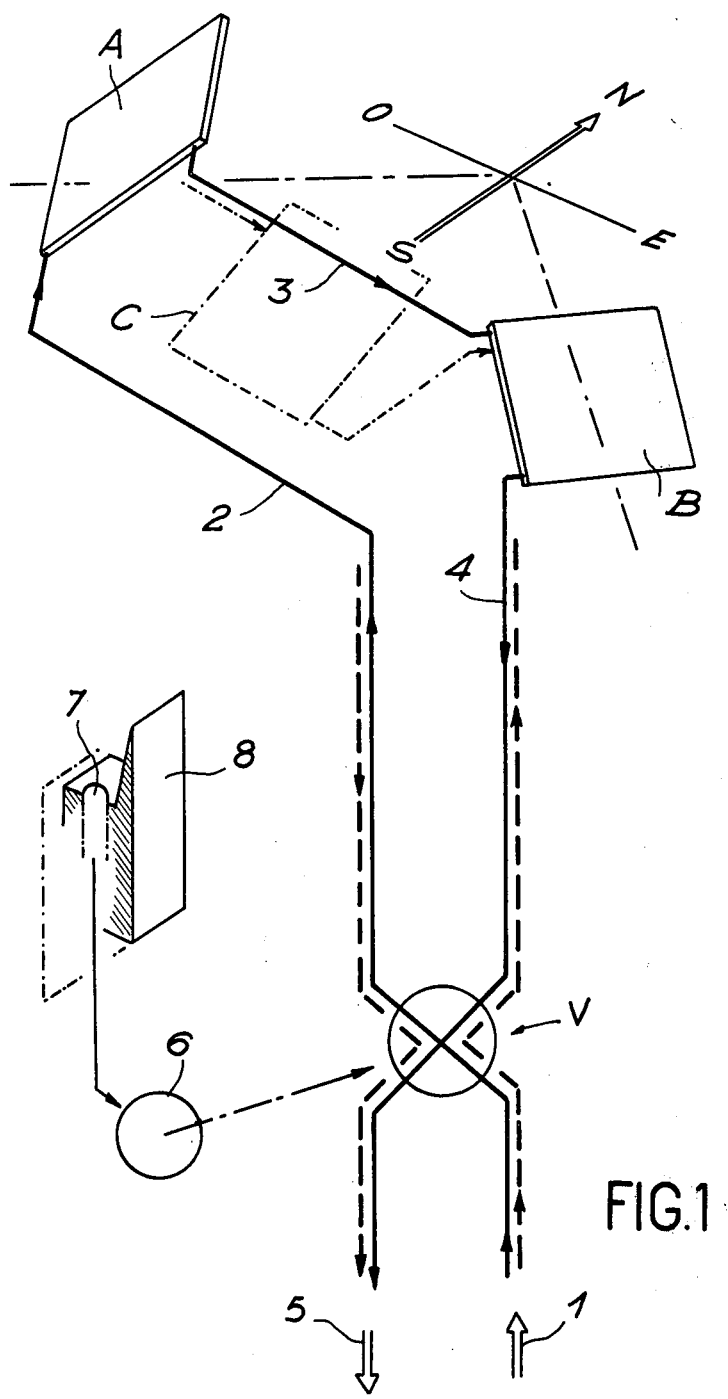
FIG. 1 illustrates the series connection of the two stationary flat solar collectors which constitute the system.

There can be seen in FIG. 1 two stationary flat solar collectors of the greenhouse or water-heater type, namely a collector A which has a south-west orientation and a collector B which has a south-east orientation. A supply of cold heat-transporting fluid is represented diagrammatically by the arrow 1. After having passed through a four-way valve V, the fluid is conveyed through the duct 2 before passing through the collector A. The outlet of the collector A is connected to the inlet of the collector B by means of the duct 3.

The hot fluid discharged from the collector B is conveyed through the duct 4, then again passes through the valve V before being discharged in the direction indicated by the arrow 5.

Figure 2:
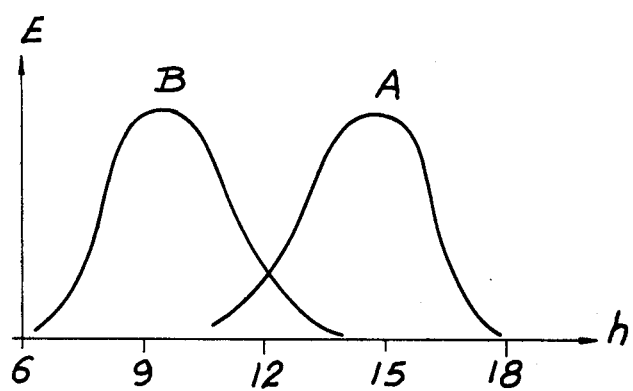
FIG. 2 shows a curve which is representative of the variations in energy delivered by each of the stationary flat collectors as a function of time.

In accordance with the indications provided by the curves of FIG. 2, the collector A delivers its maximum valve of energy at about 3 p.m. and the collector B delivers its maximum value of energy at about 9 a.m.

In accordance with the invention, the heat-transporting fluid is circulated during the morning in the direction obtained by following respectively the reference numerals 1, 2, 3, 4 and 5. The fluid is heated within the collector A mainly by collection of scattered radiation with a high level of efficiency since the collecting temperature is low and heat losses are consequently of a low order. The fluid then passes into the collector B which is exposed to full sunshine and thus attains its maximum temperature.

In the afternoon, the direction of flow of the fluid is reversed by rotating the valve V. Said fluid then flows along the path indicated respectively by the reference numerals 1, 4, 3, 2 and 5 and partly in dashed lines. Thus the cold fluid first penetrates into the collector B which is exposed to the south-east and is discharged from the collector A which is exposed to the south-west.

Figure 3:
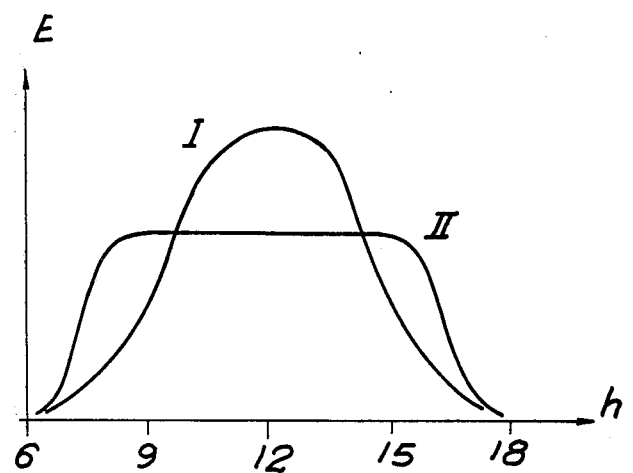
FIG. 3 shows on curve I the total energy response of two stationary flat collectors having a due-south orientation through which a heat-transporting fluid is circulated in the same direction and on curve II the total energy response of two stationary flat collectors in which the direction of flow of the heat-transporting fluid has been reversed at midday.

By virtue of this reversal of the direction of flow of the fluid, there is no longer obtained an energy response having a peak as in the case of curve I of FIG. 3 but on the contrary a flat response, that is to say a curve having a level stage in the vicinity of its peak as is clearly shown on curve II.

It is clearly apparent that the assembly shown in FIG. 1 is not limited to the use of two collectors such as A and B but can extend to a plurality of collectors. It is possible in particular to interpose a collector C having a due-south orientation as shown in chain-dotted lines.

In the majority of cases, the heat-transporting fluid employed is water and the advantage which the production of a flat response offers in this case can readily be appreciated. In fact, it is often preferable to produce a large quantity of water at a medium temperature during the greater part of the day rather than a small quantity of water at high temperature during a fraction of the day.

The advantage of a flat response as mentioned above is even greater when the collected heat is utilized for actuating a thermodynamic conversion system, in particular an organic fluid turbine. In fact, optimum conversion efficiency of these systems is usually achieved only at a precise value of temperature and heat flux and, as can be understood, it is particularly advantageous to be able to maintain these conditions throughout the day.

A clear idea of the numerous possibilities offered by the invention may be gained by making use of FIG. 3 as a basis for the following observations:

if it is required to obtain an energy response equal to one-half the maximum response in the case of the method employed and in accordance with curve I, the energy is collected between 10 a.m. and 3 p.m. approximately whereas in the case of curve II, the energy is collected between 7 a.m. and 5 p.m. This method in accordance with the invention therefore offers considerable flexibility of use.

In FIG. 1, there is shown a collector A having a south-west orientation and a collector B having a south-east orientation, an admission of cold heat-transporting fluid as represented diagrammatically by the arrow 1. After passing through a four-way valve V, the fluid is conveyed through the duct 2 before passing through the collector A.

The outlet of the collector A is connected to the inlet of the collector B by means of the duct 3. The hot fluid discharged from the collector B flows through the duct 4, then again passes through the valve V before using discharged in the direction of the arrow 5.

In accordance with the indications given by the curves of FIG. 2, the collector A provides its maximum value of energy at about 3 p.m. and the collector B delivers its maximum energy at about 3 a.m.

Different methods may be adopted for controlling the valve V. Should it be necessary to reverse the direction of flow of the fluid each day at a fixed time, for example at midday, it is clear that the control can be carried out by means of a clockwork mechanism.

It may also prove desirable to initiate reversal by means of the solar radiation itself. In that case the control device essentially consists of a manometric capsule or a piston chamber 6 in which the internal volume communicates with a reservoir 7 containing highly volatile liquid and heated by the sun. Said reservoir is integral with a small surface which serves to collect incident radiation and comprises a shutter 8 or louvers for maintaining said surface in the shade during the morning hours while permitting said surface to receive the sun's rays during the afternoon.

More simply, the valve can be controlled by means of a bimetallic strip, a photoelectric cell or any suitable device of a similar type which is placed under conditions such as to permit operation at a given temperature or light intensity.

Figure 4:
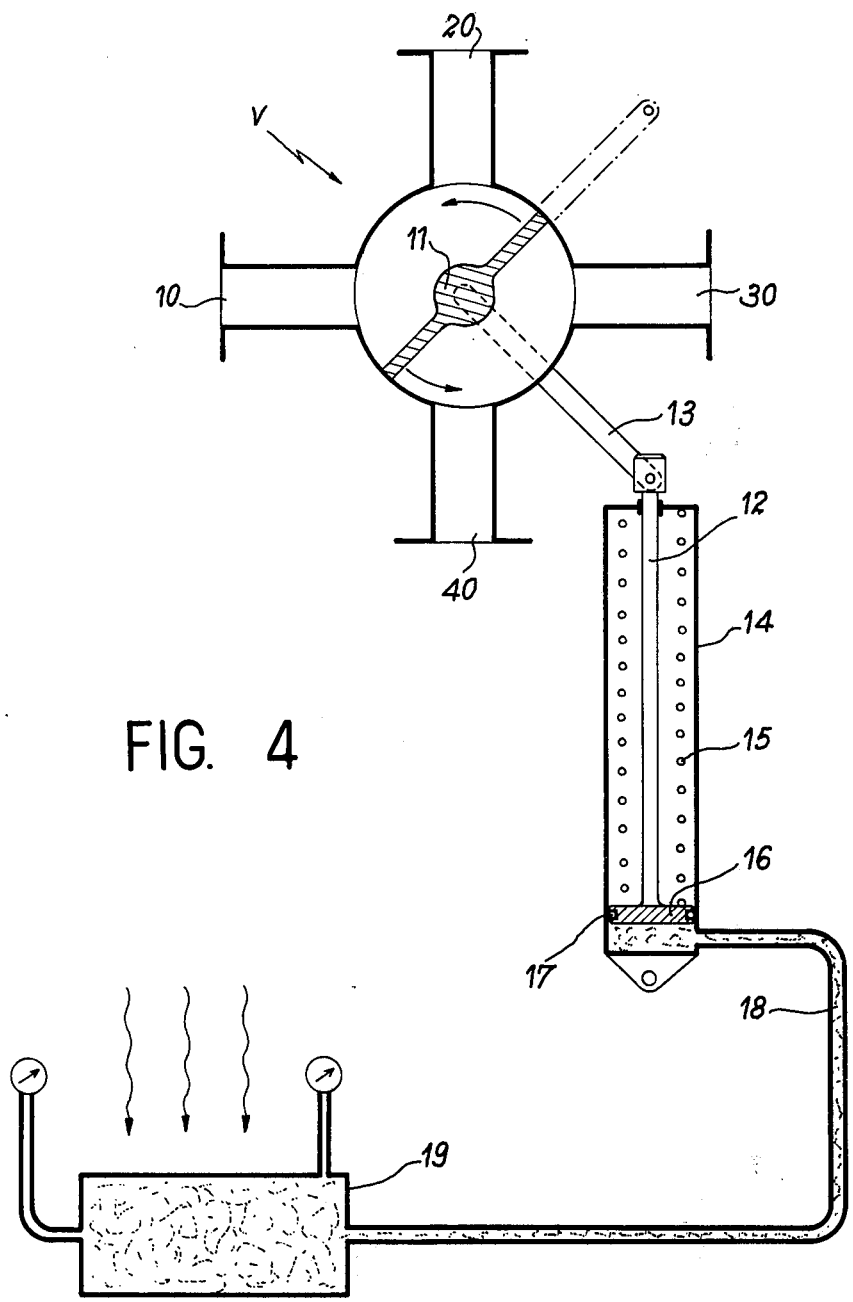
FIG. 4 shows diagrammatically an installation for controlling the circulation of the heat-transpoting fluid.

Preference is given to the use of a valve V having four passageways 10, 20 30 and 40 such as the valve shown diagrammatically in FIG. 4. The rotation of the spherical plug is controlled by the displacement of a piston 12 which is connected to the spherical plug by means of an arm 13. Said piston 12 is capable of displacement within the cylinder 14 in opposition to a restoring spring 15. The head 16 of the piston 12 is surrounded by a packing-ring of PTFE (polytetrafluoroethylene). That face of the piston-head 16 which is not in contact with the restoring spring is in contact with a driving fluid such as freon, for example. Said fluid penetrates into the cylinder 14 via the duct 18, this latter being in communication with a chamber 19 which contains said fluid and is subjected to the action of solar radiation as shown diagrammatically by the arrows.

It is readily apparent that this control installation is not specific to a four-way valve but could be applied for example to two three-way valves by interposing between the oil and the freon a chamber in which the cylinder separates the oil from the freon.

What we claim is:

1. A method for collecting solar energy by means of a system of stationary collectors differently oriented with respect to the sun, of the type in which a heat-transporting fluid is circulated; circulating the heat-transporting fluid through said system of collectors connected together in series from the collector which is least exposed to solar radiation to the collector which is the most exposed to solar radiation and reversing the direction of flow of the fluid within the collectors automatically at a moment of the day which is determined beforehand so as to control the quantity of energy delivered by the collectors by flow of the heat transporting fluid from the collector least exposed to solar radiation to the collector most exposed to solar radiation.

2. A method according to claim 1, wherein the direction of flow of the heat-transporting fluid is reversed at midday so as to obtain a flat energy response during a large part of the day.

3. A method according to claim 1, wherein the direction of flow of the heat-transporting fluid is reversed at a time which is determined beforehand in order to obtain a heat peak at one particular moment of the day.

4. A device for collecting solar energy comprising a system of stationary collectors differently oriented with respect to the sun, means circulating a heat transporting fluid through said collectors in series from the collector least exposed to solar radiation to the collector most exposed to solar radiation, means for reversing automatically the direction of flow of said fluid at a predetermined time, said reversing means including a four-way valve.

5. A device according to claim 4, wherein the four-way valve is controlled by means of an element which is sensitive to solar radiation.

6. A device according to claim 5, wherein said element is a reservoir containing highly volatile liquid in relation with a manometric capsule or a piston chamber.

7. A device according to claim 5, wherein said element is a bimetallic strip.

8. A device according to claim 5, wherein said element is a photoelectric cell.

9. A device according to claim 4, including a clockwork mechanism controlling said valve.

* * * * *